United States Patent [19]
Bourgeois

[11] Patent Number: 5,666,893
[45] Date of Patent: *Sep. 16, 1997

[54] CROP SPRAYER GUIDANCE SYSTEM

[76] Inventor: Raymond A. Bourgeois, Ste. 206—1697 Pembina Hwy., Winnipeg, Manitoba, Canada, R3T 2G6

[*] Notice: The term of this patent shall not extend beyond the expiration date of Pat. No. 5,429,061.

[21] Appl. No.: 499,445

[22] Filed: Jul. 7, 1995

Related U.S. Application Data

[63] Continuation-in-part of Ser. No. 105,114, Aug. 12, 1993, Pat. No. 5,429,061.

[30]   Foreign Application Priority Data

Aug. 18, 1992 [CA] Canada ................................. 2076287

[51] Int. Cl.⁶ ........................................................ A01C 19/00
[52] U.S. Cl. ........................................ 111/200; 111/903
[58] Field of Search ................................. 111/170, 171, 111/172, 173, 174, 200, 903, 904, 918; 221/13, 131, 105; 137/554, 556; 251/326, 329

[56]   References Cited

U.S. PATENT DOCUMENTS

| | | |
|---|---|---|
| 46,523 | 2/1865 | Doubler . |
| 3,888,387 | 6/1975 | Deckler . |
| 3,912,121 | 10/1975 | Steffen . |
| 4,023,707 | 5/1977 | Johnson . |
| 4,106,414 | 8/1978 | Vastag . |
| 4,122,974 | 10/1978 | Harbert et al. . |
| 4,516,670 | 5/1985 | Sorensen, Jr. . |
| 4,872,785 | 10/1989 | Schrage et al. . |
| 4,912,681 | 3/1990 | Halsey et al. . |
| 4,930,431 | 6/1990 | Alexander . |
| 4,949,656 | 8/1990 | Lyle et al. . |
| 4,989,524 | 2/1991 | Brown et al. . |
| 5,003,894 | 4/1991 | Lafferty . |
| 5,024,173 | 6/1991 | Deckler . |
| 5,025,951 | 6/1991 | Hook et al. . |
| 5,074,228 | 12/1991 | Daws . |
| 5,078,066 | 1/1992 | Lafferty . |
| 5,429,061 | 7/1995 | Bourgeois ................. 111/200 |

*Primary Examiner*—Terry Lee Melius
*Assistant Examiner*—Robert Pezzuto
*Attorney, Agent, or Firm*—Murray E. Thrift; Adrian D. Battison

[57]   ABSTRACT

For marking a field with unseeded rows during seeding, the seed box of a seed drill is equipped with a valve unit mounted inside the box for shutting off seed flow to one of the seed cups during selective passes. A control system for the unit allows the shut-off to be automatic, after a selective number of passes have been completed, or manual as selected by the operator. The unseeded rows are used after germination for guiding a crop sprayer so that there will be no spray overlap and no gaps between the sprayer passes.

17 Claims, 7 Drawing Sheets

5,666,893

CROP SPRAYER GUIDANCE SYSTEM

CROSS REFERENCE TO RELATED APPLICATION

This application is a continuation-in-part of application Ser. No. 08/105,114 filed Aug. 12, 1993, now U.S. Pat. No. 5,429,061.

FIELD OF THE INVENTION

The present invention relates to field marking.

BACKGROUND

In the spraying of agricultural chemicals, it is important to minimize the double spraying of crops due to overlap off sprayer passes and also to eliminate any gaps between the sprayer passes. To enable this, systems have been developed for dropping markers, for example patches of foam, paper or chalk on a field to designate the edge of a sprayer pass. Other systems use discs that leave a mark on the ground. These systems are all subject to visibility problems, especially where spraying is being done at night, the most common time for such work because of reduced winds.

Another system which has been developed is the "tramline" system that leaves unseeded rows at appropriate intervals along a field to accommodate the tires of a tractor. While this system is effective in that it provides a reliable, highly visible and easy to follow marking in the field, the mechanisms used to achieve the desired result generally include rather complex clutching mechanisms on the drive shaft for the conventional seed flute. It may require a permanent modification of the seed metering drive shaft.

The present invention is concerned with a field marking system that is easily and simply retro-fit into any common seed drill and involves no permanent modification of the seeder.

SUMMARY

According to one aspect of the present invention there is provided 1.

A valve assembly for use with a seed box of a seeder to control seed flow therethrough, the valve assembly comprising:

base means having an outlet aperture therein, the base means comprising a bottom wall and a cover;

slide valve means including a valve plate mounted between the bottom wall and the cover for sliding movement between an open position adjacent the aperture and a closed position extending across the aperture, motor means remote from the base;

valve plate translating means for moving the valve plate between the open and closed positions, including linkage means connecting the motor and the valve plate for moving the valve plate between the open and closed positions in response to operation of the motor; and control means for controlling operation of the motor means whereby seed may selectively be omitted from selected rows during planting so as to mark a field.

The valve controlling the seed delivery is inside the seed box, using a simple, easily installed, internal valve unit.

Preferably, the control system may provide automatic control so that a marker row will automatically be omitted after a predetermined number of passes. For manual control, the control mechanism preferably has a display showing the number of passes completed since the last marker row or the number of passes to complete before the next marker row is to be made.

According to another aspect of the present invention there is provided, in a seeder having a transversely elongate seed box with a bottom wall having a plurality of seed dispensing openings spaced therealong, and seed metering and planting means below the seed dispensing openings for planting seed at a predetermined, metered rate, the improvement comprising valve means for selectively dosing one of the seed dispensing openings, means mounting the valve means on the bottom wall, inside the seed box, the valve means including a valve plate, means mounting the valve plate for movement between a dosed position extending across said one of the seed dispensing openings and an open position located beside the said one of the seed dispensing openings, and motor means for moving the valve plate between the dosed and open positions.

Preferably the valve is inside the grain box and the motor outside, providing minimum obstruction in the seeder box. The assembly may be substantially universal and suited to be mounted in almost any manufacturer's seed box. A base plate mounted permanently in the seed box carries clamps for clamping the valve properly into the seed box.

BRIEF DESCRIPTION OF THE DRAWINGS

In the accompanying drawings, which illustrate an exemplary embodiment of the present invention.

DETAILED DESCRIPTION

Figure 1:
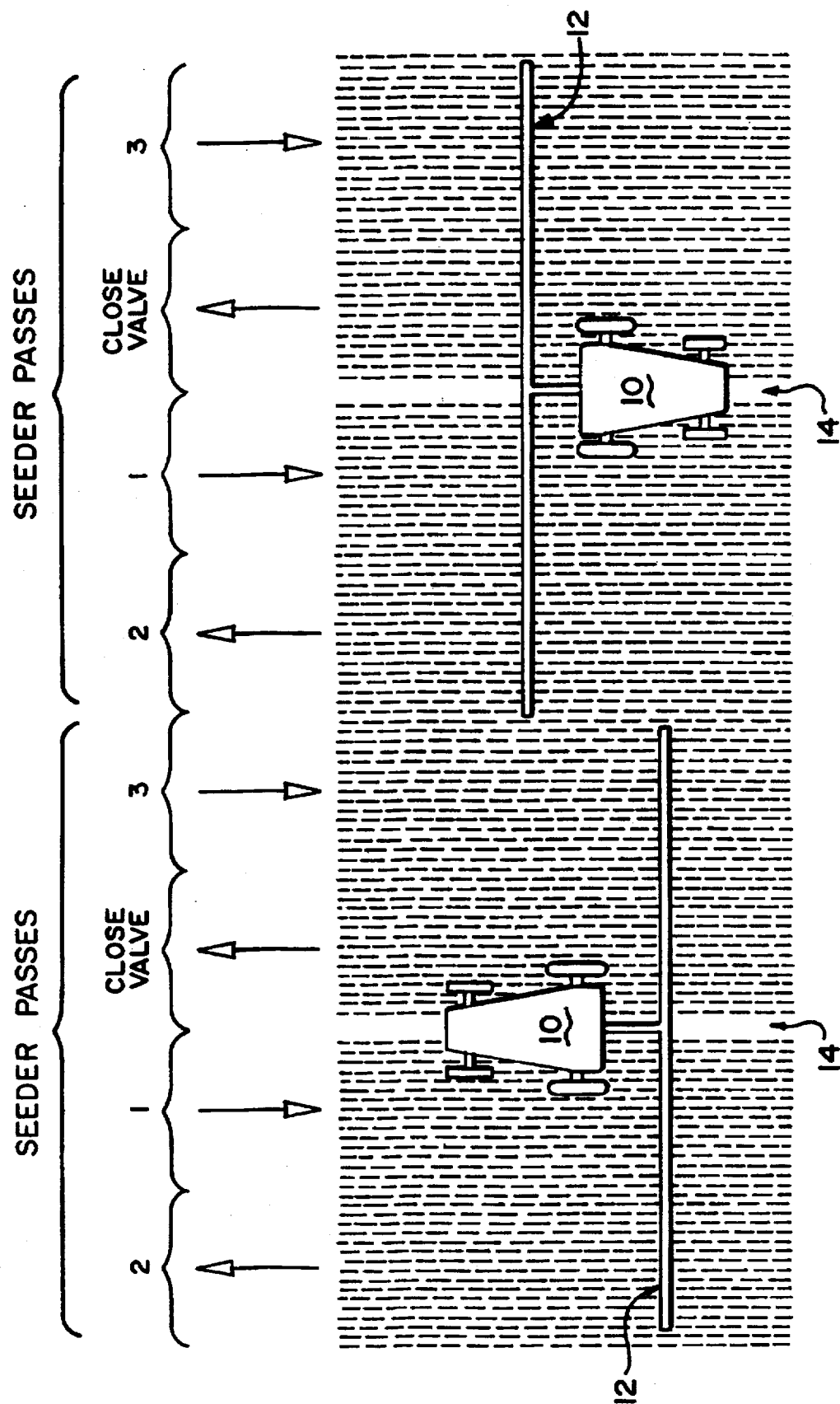
FIG. 1 is a plan view schematically illustrating the theory of operation.

Referring to the accompanying drawings, especially to FIG. 1, there is illustrated a sprayer 10 spraying a field using a boom 12. In this instance, the field has been seeded using a seeder with a 24 foot width. In seeding the field, one row of seed has been omitted on every four passes of the seeder. This leaves marker lines 14 with no crop growth at 96 foot spacings across the field. Since the boom is 96 feet in length, the sprayer 10 may follow the marker lines across the field and cover the complete crop with no overlap or gaps between the boom passes.

Figure 2:
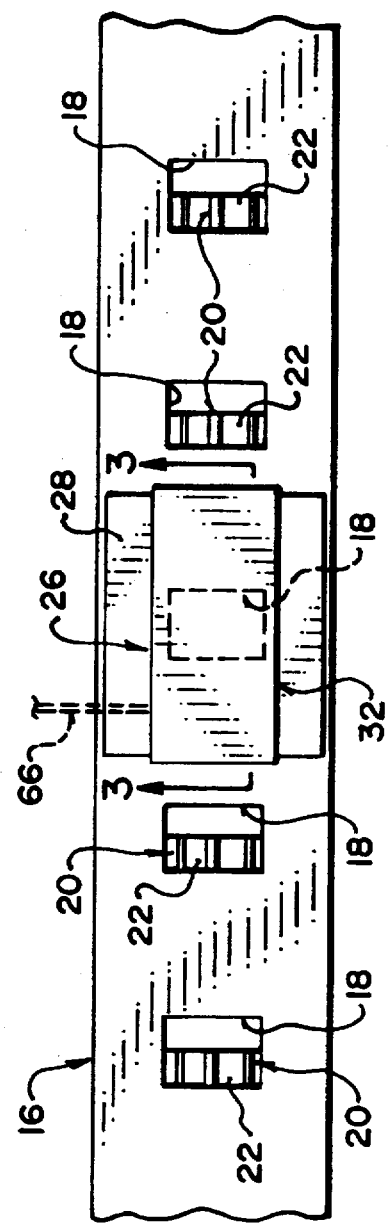
FIG. 2 is a plan view of a seed box with a valve unit installed.
Figure 3:
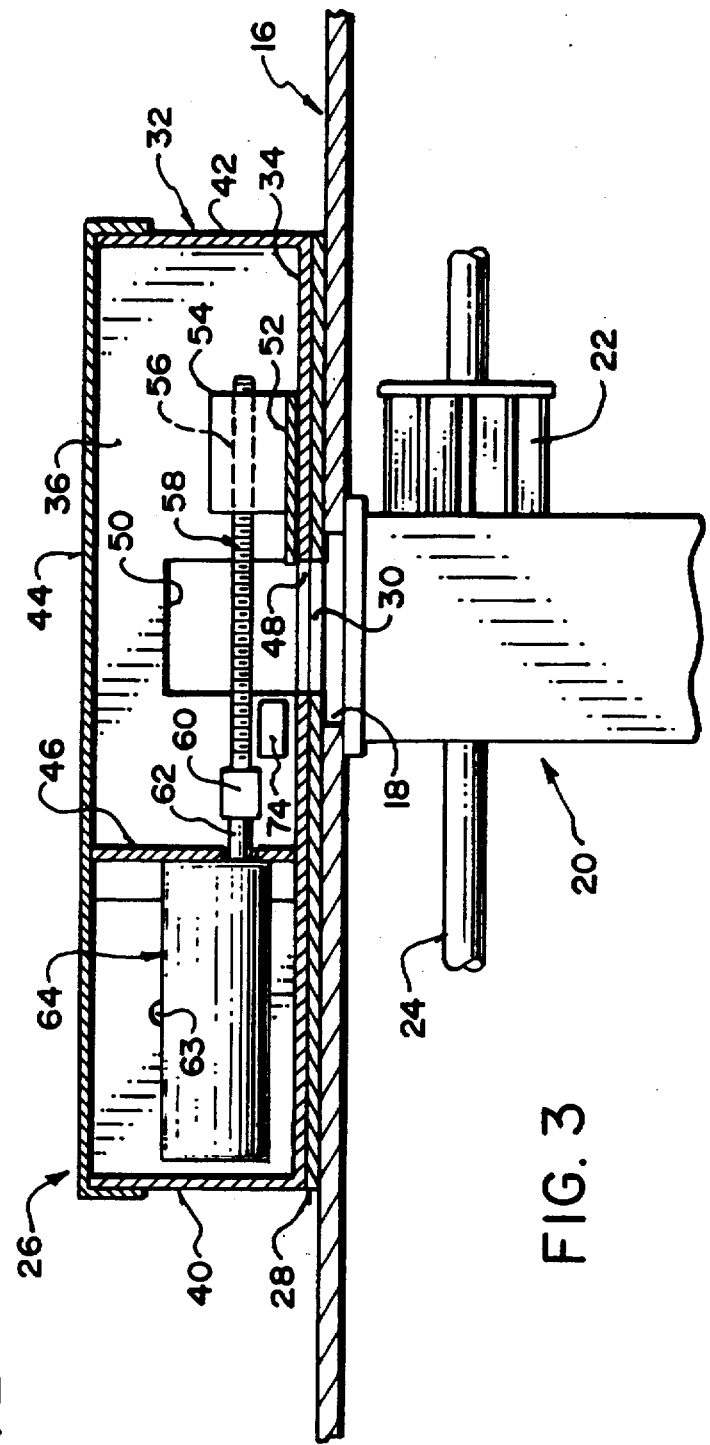
FIG. 3 is a sectional view along line 3—3 of FIG. 2.
Figure 4:
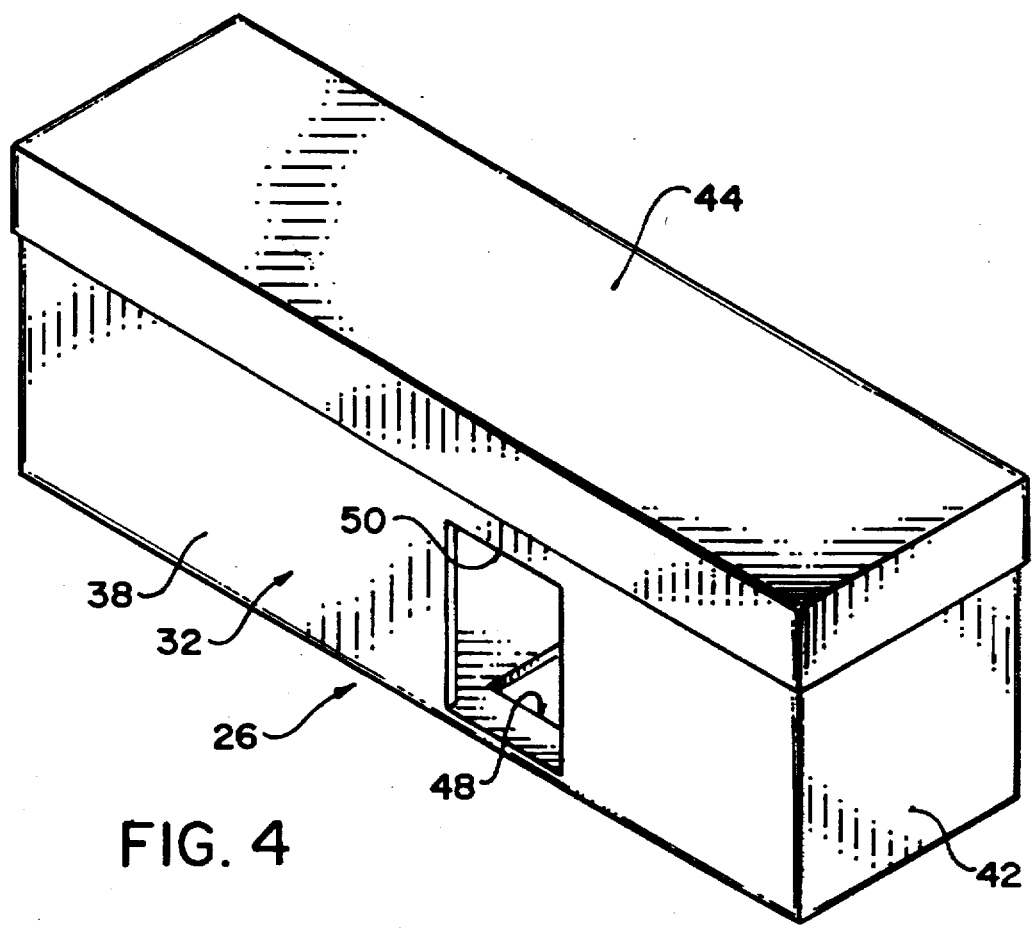
FIG. 4 is an isometric view of the valve unit.
Figure 5:
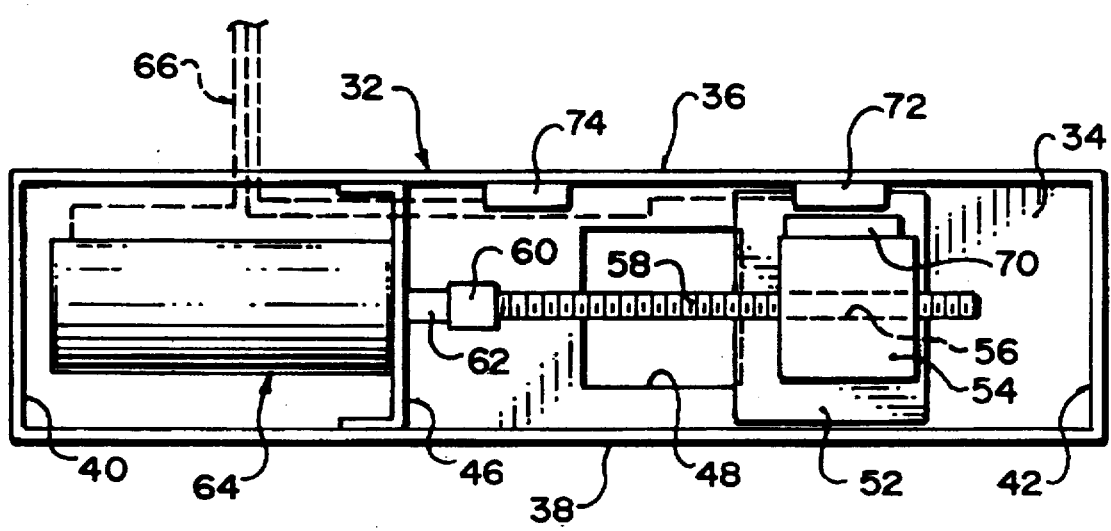
FIG. 5 is a plan view of the valve unit with the cover removed.
Figure 6:
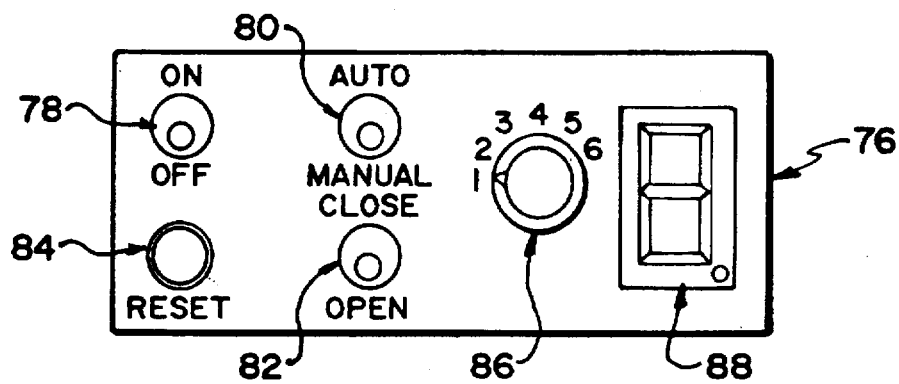
FIG. 6 is a front view of a control unit.

FIGS. 2 and 3 illustrate a seed box 16 of a conventional form with a series of seed discharge openings 18 along the bottom wall of the box. Below each discharge opening is a seed meter 20 with the usual flute 22 for metering the seed from the seed box and driven by a transverse drive shaft 24. This structure is conventional.

To shut off the seed flow to one of the seed meters, a valve unit 26 is mounted inside the seed box, on the bottom wall, over one of the seed discharge openings 18. The valve unit has a base plate 28 that extends the full depth of the seed box bottom from back to front. This plate has a seed opening 30 that is in registry with the controlled seed discharge opening 18 of the seeder. Mounted on the base plate is a housing 32. The housing contains all of the working parts of the valve unit and may be removed from the base plate 28 and installed on alternative base plates with different sizes in order to fit the seed boxes of different manufacturers. Thus, the valve unit is "universal" in its application.

The housing 32 has a bottom wall 34, front and back walls 36 and 38 and two side walls 40 and 42. The top side of the housing is closed with a cover 44. Within the housing is a transverse panel 46 separating the interior of the housing into two compartments, arranged side by side.

A seed outlet opening 48 is formed in the bottom wall 34 of the housing and is aligned with the seed opening 30 in the base plate 28 and the respective seed discharge opening 18. The housing itself is oriented with its longest, side to side, dimension extending along the seed box in order to keep the complete valve unit entirely within the seed box and to avoid any need to modify the seed box. Two seed inlets 50 are formed in the front and back walls 36 and 38 in alignment with the seed outlet 48. These are sufficiently large that seed will run into the housing 32 through the inlets 50 and then through the outlet 48 to the seed discharge opening 18.

For closing the seed outlet 48, the housing has, in the same chamber as the outlet 48, a valve plate 52. This is a flat plate lying flush on the top surface of the bottom wall 34 of the housing.

The valve plate 52 carries a block 54 with a threaded bore 56 extending side to side in the housing. A threaded rod 58 is screwed into the bore 56 and is connected by a shaft coupling 60 to a motor output shaft 62 adjacent the transverse wall 46. The shaft extends through an opening in the wall to the second compartment, where its motor 64 is located. The wiring 66 for the motor 64 is let out of the housing through an opening 68 in the back wall. Operation of the motor rotates the threaded rod 58 and thus translates the valve plate back and forth in the housing to open or close the seed outlet 48.

The block 54 on the valve plate carries a magnet 70. This actuates two magnetic limit switches 72 and 74 inside the housing, with switch 72 being actuated when the valve is fully open and switch 74 being actuated when the valve is fully closed. The leads from the switches extend through the transverse wall 46 into the motor compartment and are brought out to the control system as part of the wiring 66.

The apparatus includes a console 76 that is mounted in the cab of the tractor pulling the seeder. The console has an off/on power switch 78 for turning the unit on and off. An automatic-manual switch 80 selects either automatic operation in which the unit operates automatically to shut off seed delivery after a set number of passes or operates in a manual mode controlled entirely by the operator using close-open switch 82. A reset switch 84 is used to reset the system to its initial condition or in conjunction with a multi position select switch 86 to set a new set of initial conditions. A single digit display 88 is also located on the console. It is a seven segment LED display with an additional decimal point.

Figure 7:
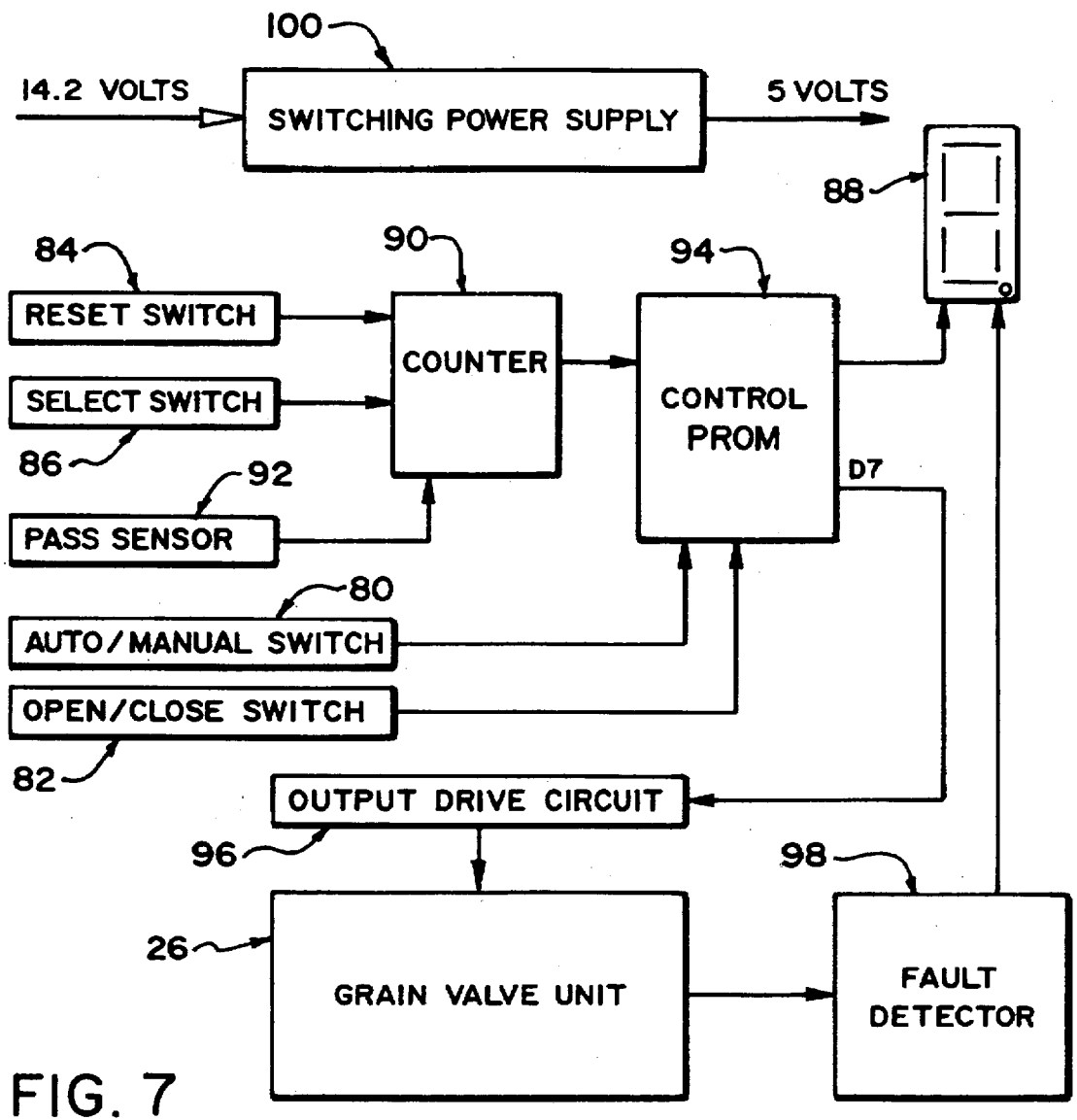
FIG. 7 is a control unit schematic block diagram.

The basic arrangement of the control system is illustrated in FIG. 7. As shown in that figure, a counter 90 receives input from the reset switch 84, the select switch 86 and a pass sensor switch 92. The pass sensor switch is a magnetic switch located on a stationary part of the seeder. It is actuated by a magnet on a part of the seeder, for example the seed box, that is raised at the end of a pass in order to turn the tractor and seeder for a return pass across the field. The counter output is passed to a control programmable read only memory (PROM) 94 which also receives input from the automatic-manual switch 80 and the closed-open switch 82. The control PROM delivers output to an output drive circuit 96 for driving the motor 64 of the valve unit and to the display 88. The two switches 72 and 74 of the valve unit 26 output to a fault detector 98 which is also coupled to the display 88 to provide a fault signal to the display.

The control system is supplied with operating power from the switching power supply 100. This power supply takes the incoming +14.2 volts from the tractor battery and outputs +5 volts for the control circuit. A switching regulator is particularly suited for the present unit because of its efficiency and size.

Figure 8:
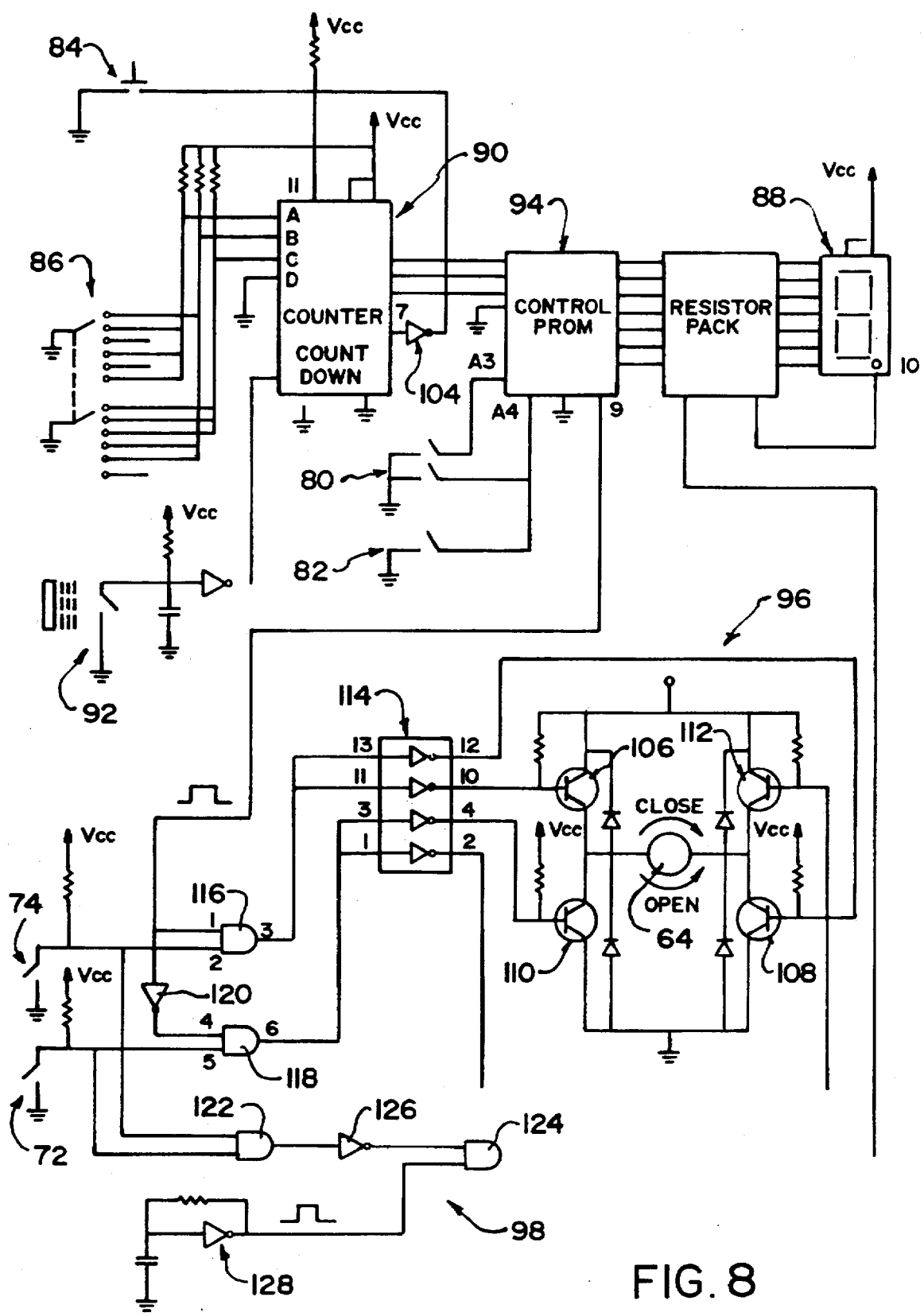
FIG. 8 is a control schematic.

The detailed schematic of the controls is illustrated in FIG. 8.

As illustrated in that Figure, the selector switch 86 is a double pole, six throw switch connected to pins A, B, C of the counter 90 which is, in this embodiment, a 74LS192 counter. The input configuration of the pass select switch is as follows:

| Position | C | B | A |
| --- | --- | --- | --- |
| 1 | 0 | 0 | 1 |
| 2 | 0 | 1 | 0 |
| 3 | 0 | 1 | 1 |
| 4 | 1 | 0 | 0 |
| 5 | 1 | 0 | 1 |
| 6 | 1 | 1 | 0 |

In operation, the input select switch 86 is first set by the operator to the required number of passes for a particular seeder/sprayer width combination. This selection is then loaded into the counter 90 using the reset switch 84.

Once the pass selection has been loaded into the counter, the operator begins seeding along the field. At the end of one pass, the seeder is raised and lowered again for the next pass. The normally open pass sensor switch 92 detects this and generates a low pulse when it closes. The pulse is inverted and sent as a positive going pulse to the count down input pin of the counter 90. The counter then counts down by one indicating that the seeder has completed one pass. The process continues until the counter reaches a count of zero. At this point, the grain valve 52 closes, blocking the flow of grain in one particular row. Once the operator has completed pass zero, the next raising and lowering of the seeder will force the counter 90 to go to a binary 9 output. Pin 7 of the counter 90 is the most significant bit and this is fed to a Schmitt inverter 104. The output of the inverter is then fed to the load input of the counter on pin 11. This resets the counter to the original pass selection. The whole process keeps repeating as the seeding progresses, pass after pass.

The output control PROM 94 takes information from counter 90 and the double pole double throw automatic-manual switch 80, and outputs the required drive signals for the LED display 88 and the valve unit 26. The PROM 94 is based on Texas Instruments TBP18S030, 32 by 8 Bit word PROM. The 32 words are divided into four memory areas:

1. Words 0–7 are dedicated to the automatic mode of operation;
2. Words 8–15 are dedicated to the manual "close valve" operation;
3. Words 16–23 are not used; and 4. Words 24–34 are dedicated to the manual "open valve" operation.

In the automatic mode of operation, address bits A3 and A4 are set to zero. Thus only the first 8 words are selected. The PROM 94 then takes the output signals from the counter 90 and from this, determines which of the 8 words should be selected. One word is dedicated to each possible pass selection (i.e. 1, 2, 3, 4, 5 or 6) and one word is dedicated to the 'close valve' operation. Word 7 is not used. Depending on which word is selected, either the output data line 7 will be Hi or Lo. This line is used to turn the Output Drive Circuitry either on or off, which corresponds to the seed valve being either closed or open. Output data lines D0 to D6 are used to drive the 7-segment LED display 88. This LED indicates at which pass the operator is at (in which case the grain valve is still open), or it indicates that the grain valve is closed (i.e. during the pass zero).

In the manual mode of operation, either words 8 to 15 or words 24 to 31 are selected. Address bit A3 is held Hi during this time by the automatic-manual switch 80, in order to accomplish this. If the close valve operation is chosen with switch 82, then address bit A4 is held Lo, thereby choosing words 8 to 15. The output on D7, pin 9 will go Hi to signal the output drive circuit 96 to close the valve. The LED display 88 will show a 'C' to indicate this. If on the other hand the open valve operation is chosen, address bit A4 is held Hi, thereby choosing words 24 to 31. The output on D7, pin 9 will now go Lo, signaling to the output drive circuit 96 to open the grain valve. The LED display 88 will now show 'O' to indicate this.

The drive circuit 96 provides the necessary voltage, at the proper polarity, to the D.C. motor 64 in the valve 26 in order to open or close the valve. It consists of four transistors 106, 108, 110 and 112, a 7406 output inverter chip 114, two NAND gates 116 and 118 and the two limit switches 72 and 74 of the valve unit. It operates as follows:

When pin 9 of the control PROM 94 goes Hi, indicating that the motor is to close the grain valve, the output on pin 3 of NAND gate 116 goes Lo. This Lo. signal is fed to pins 11 and 13 of the inverter chip 114, forcing the outputs on pin 12 and 10 to go Hi. This turns transistors 106 and 108 on hard (i.e. saturation), forcing current to flow through the motor. The motor, which is connected to the seed valve via the grain valve shaft, begins to rotate clockwise, which forces the grain valve to start closing. When the grain valve has reached the end of its required travel, the fully closed limit switch 74 of the valve unit closes, forcing a Lo signal on pin 2 of NAND gate 16. This causes the output to go Hi, which in turn forces the outputs on pins 12 and 10 of the chip 114 to go Lo. The transistors 106 and 108 are then cut off and the motor stops rotation. When the seed valve starts to close, the fully open limit switch 72 opens up, forcing a Hi level on pin 5 of NAND gate 118.

When the valve opens up again, pin 9 of the Control PROM 94 goes Lo. This Lo signal gets inverted by a Schmitt inverter 120, and gets fed to pin 4 of NAND gate 118. Since open switch 72 is still open, a Hi level is present on pin 5 of NAND gate 118. Thus, the output of the NAND gate goes Lo, gets inverted by the inverter chip 114, and turns transistors 110 and 112 on. Current now flows in the opposite direction through the motor, forcing it to rate counterclockwise. The valve then begins to open up. When it reaches the end of its required travel, the fully open limit switch 72 closes, forcing a Lo level on pin 5 of NAND gate 118. The output of the NAND gate then goes Hi, gets inverted by chip 114, and cuts off transistors 110 and 112. The motor then comes to a stop. When the valve starts to open, the fully closed switch 74 opens up, forcing a Hi level on pin 2 of NAND gate 116. Thus the circuit is ready for the next time when the output on pin 9 of the control PROM 94 goes Hi. This indicates that it is time to close the valve again, and the whole process repeats itself.

The fault detection circuit 98 alerts the operator that something is wrong with the valve unit. This could be a jammed grain valve, an improperly seated grain valve or a broken connection along the wiring harness. The circuit consists of two NAND gates 122 and 124, and inverter 126 and an oscillator 128.

Whenever both limit switches are open, the output of NAND gate 122 goes Lo. This Lo level gets inverted by inverter 126, which is fed to pin 10 of NAND gate 124. This NAND gate acts as a "front door" for the oscillator output. When pin 10 is at a Hi level, the oscillator signal is fed through to the output. This output then goes to pin 10 of the 7-segment LED 88, which corresponds to the decimal point. Thus if both pins 12 and 13 of NAND gate 122 are Hi, indicating a malfunction, the decimal point on the LED 88 will begin to flash at approximately 4 hertz. This will alert the operator that something has gone wrong. When the grain valve is either closing or opening, both limit switches will be open for approximately four seconds. Thus a flashing LED at the end of a pass does not indicate an error. It merely indicates that the motor is presently running.

Figure 9:
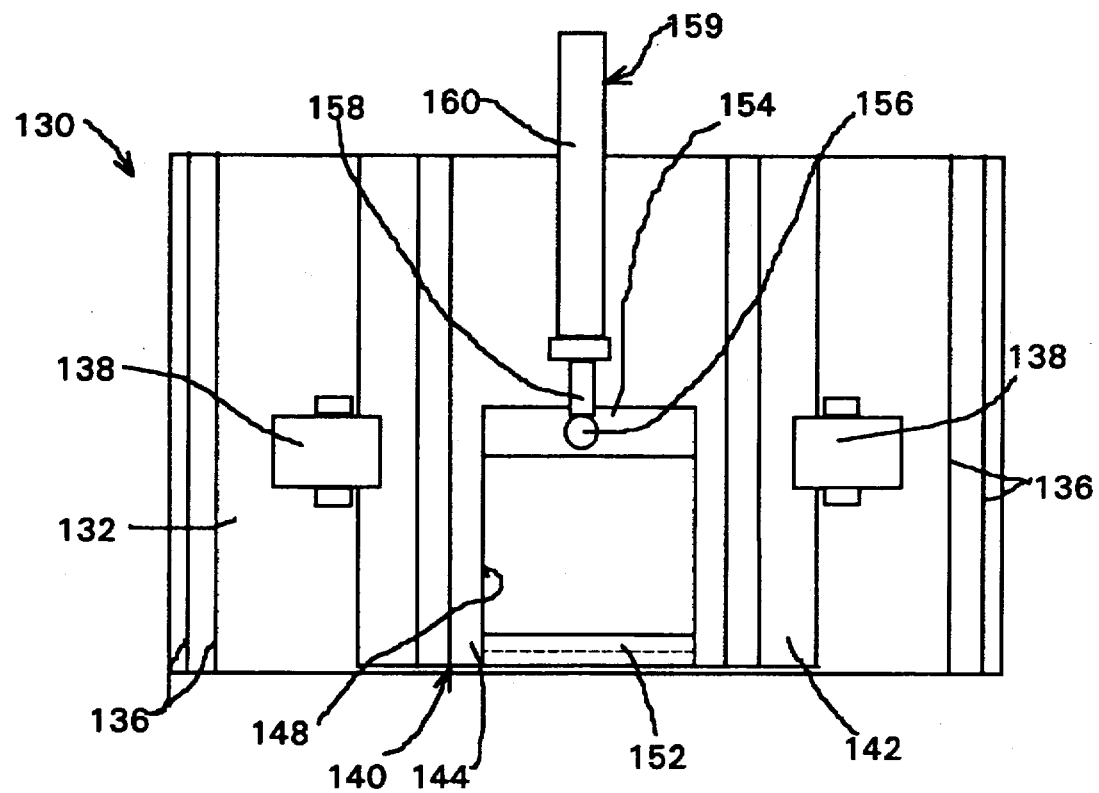
FIG. 9 is a plan view of an alternative embodiment of the valve unit.
Figure 10:
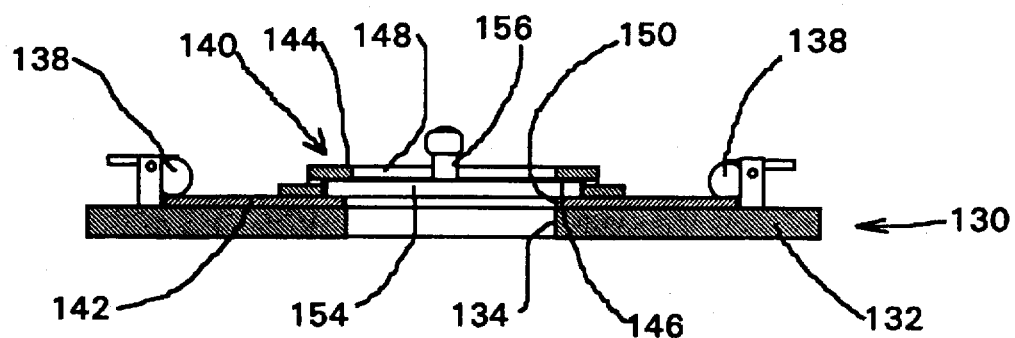
FIG. 10 is a view along line 10—10 of FIG. 9.
Figure 11:
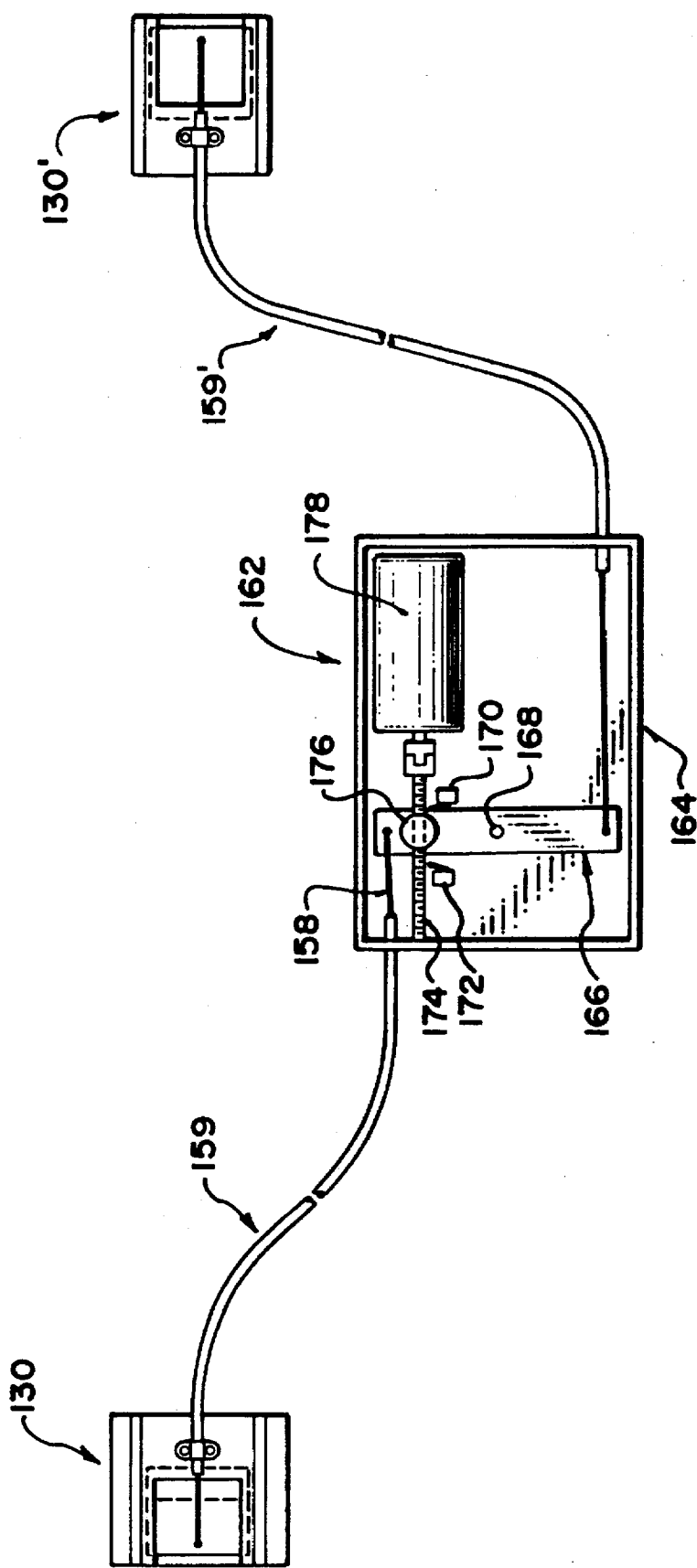
FIG. 11 is a plan view of a motor unit for the valve of FIG. 9.

An alternative embodiment of the invention is illustrated in FIGS. 9, 10 and 11. In FIGS. 9 and 10, the valve unit 130 includes a base plate 132 that is permanently mounted on the bottom wall of the seed box. The base plate has a seed opening 134 that aligns with the seed opening in the seed box. The opposite sides of the base plate have score lines 136 to provide snap off edges so that the base plate can be fit into most any seed box. The base plate carries a set of over—center clamps 138 that clamp a base unit 140 onto the top of the base plate. The base unit includes a bottom wall 142 and a cover 144 that provide between them a slot 146. The bottom wall and cover have registering openings 148 and 150 adjacent one end of the base unit. At that end, a foam block 152 extends across the base unit, between the bottom wall and the cover.

A valve plate 154 slides in the slot 146 between an open position retracted into the slot and opening the openings 148 and 150 and a closed position extending across the openings and engaging the foam block 152. The foam block serves for seed release, so that any seed captured between the side of the valve plate and the foam block will not cause jamming of the valve.

A lug 156 is mounted on the top of the valve plate 154 and is connected to the core 158 of a cable 159. The cable sheath 160 is connected to the cover 144.

The cable 159 leads from the valve unit to a motor unit 162 illustrated in FIG. 11. This motor unit has a housing 164 carrying a pivot arm 166 mounted on the base by a pivot 168. The cable core is connected to the rocker arm at a position spaced from the pivot. A second cable 159' is connected to the arm 166 on the other side of pivot 168 for operating a second valve unit 130'. The cable sheaths are fastened to the motor unit housing. Two limit switches 170 and 172 are mounted on the motor unit housing for actuation by the pivot arm when it is in either an open or closed position corresponding to the open and closed positions of the valve plate. The pivot arm is driven by a lead screw 174 running in a nut 176 mounted slidably and rotatably on the arm. The lead screw is driven by a reversible electric motor 178.

While particular embodiments of the present invention have been described in the foregoing it is to be understood that other embodiments are possible within the scope of the invention. For example, the valve plate 52 may be mounted in nylon or the like glides above the base plate 28 to avoid jamming of some sizes of seed. The valve unit may be mounted to eliminate seed rows that coincide with the left wheel of the tractor during spraying operations, rather than the centre of the tractor. Where desired two valves can be used in the seed box to generate tram lines. Other modifications will be apparent to those skilled in the art. The invention is thus to be considered limited solely by the scope of the appended claims.

I claim:

1. A valve assembly for use with a seed box of a seeder to control seed flow therethrough, the valve assembly comprising:

base means comprising a bottom wall having an outlet aperture therein;

slide valve means including a valve plate mounted on the bottom wall for sliding movement between an open position adjacent the aperture and a closed position extending across the aperture, motor means remote from the base means;

valve plate translating means for moving the valve plate between the open and closed positions, including linkage means connecting the motor and the valve plate for moving the valve plate between the open and closed positions in response to operation of the motor; and control means for controlling operation of the motor means whereby seed may selectively be omitted from selected rows during planting so as to mark a field.

2. A valve assembly according to claim 1 wherein the linkage means comprise a cable.

3. A valve assembly according to claim 1 wherein the motor means comprise an electric motor.

4. A valve assembly according to claim 1 including a resilient cushion mounted on the base means at a position to be engaged by the valve plate in the closed position of the valve plate and spaced from the valve plate in the open position of the valve plate.

5. In a seeder having a transversely elongate seed box with a bottom wall having a plurality of seed dispensing openings spaced therealong, and seed metering and planting means below the seed dispensing openings for planting seed at a predetermined, metered rate, the improvement comprising valve means for selectively closing one of the seed dispensing openings, means mounting the valve means on the bottom wall, inside the seed box, the valve means including a valve plate and means mounting the valve plate for movement between a closed position extending across said one of the seed dispensing openings and an open position located beside the said one of the seed dispensing openings, motor means located outside the seed box and linkage means coupling the motor means to the valve means for moving the valve plate between the closed and open positions.

6. A seeder according to claim 5 wherein the valve means include a base unit on which the valve plate is mounted.

7. A seeder according to claim 6 wherein the base unit includes a bottom wall, a seed outlet opening in the bottom wall and a cover unit over the bottom wall defining a slot in which the valve plate is slidable.

8. A seeder according to claim 7 including a base plate mounted on the bottom wall of the seed box, the base plate having an opening therethrough aligned with the seed dispensing opening and clamp means for releasably mounting the base unit on the base plate.

9. A valve assembly according to claim 1 including control means for controlling operation of the motor, the control means comprising a pass sensor means responsive to raising of the seed box for generating a pass signal.

10. A valve assembly according to claim 9 wherein the control means include means for receiving pass signals, means for counting the pass signals and means for actuating the motor means to move the valve plate to the closed position in response to the number of pass signals equaling a predetermined number of pass signals.

11. A valve assembly according to claim 10 including switch means manually actuable to operate the motor means to move the valve plate between the open and closed positions.

12. A valve assembly according to claim 10 including reset means for resetting the number of passes counted to zero.

13. A valve assembly according to claim 10 including preselect means manually operable to select the predetermined number of pass signals.

14. A valve assembly according to claim 10 wherein the control means include means for displaying the number of pass signals received in response to operation of the means for counting the pass signals.

15. A valve assembly according to claim 14 including switch means manually actuable to operate the motor means to move the valve plate between the open and closed positions.

16. A valve assembly according to claim 15 including reset means for resetting the number of passes counted to zero.

17. A valve assembly according to claim 16 including preselect means manually operable to select the predetermined number of pass signals.

* * * * *